(12) United States Patent
Lovie et al.

(10) Patent No.: US 8,625,947 B1
(45) Date of Patent: Jan. 7, 2014

(54) LOW-SMOKE AND FLAME-RETARDANT FIBER OPTIC CABLES

(75) Inventors: Raymond G. Lovie, Hickory, NC (US); Brian G. Risch, Granite Falls, NC (US)

(73) Assignee: Draka Comteq, B.V., Amsterdam (NL)

( * ) Notice: Subject to any disclaimer, the term of this patent is extended or adjusted under 35 U.S.C. 154(b) by 232 days.

(21) Appl. No.: 13/116,141

(22) Filed: May 26, 2011

Related U.S. Application Data

(60) Provisional application No. 61/349,365, filed on May 28, 2010.

(51) Int. Cl.
*G02B 6/44* (2006.01)

(52) U.S. Cl.
USPC ............ 385/113; 385/100; 385/109; 385/112

(58) Field of Classification Search
USPC .................................................. 385/112, 113
See application file for complete search history.

(56) References Cited

U.S. PATENT DOCUMENTS

| | | | |
|---|---|---|---|
| 4,575,184 A * | 3/1986 | Ueno et al. .................... 385/101 |
| 4,838,643 A | 6/1989 | Hodges et al. |
| 5,574,816 A | 11/1996 | Yang et al. |
| 5,717,805 A | 2/1998 | Stulpin |
| 5,761,362 A | 6/1998 | Yang et al. |
| 5,911,023 A | 6/1999 | Risch et al. |
| 5,982,968 A | 11/1999 | Stulpin |
| 6,035,087 A | 3/2000 | Bonicel et al. |
| 6,066,397 A | 5/2000 | Risch et al. |
| 6,085,009 A | 7/2000 | Risch et al. |
| 6,134,363 A | 10/2000 | Hinson et al. |
| 6,175,677 B1 | 1/2001 | Yang et al. |
| 6,181,857 B1 | 1/2001 | Emeterio et al. |
| 6,210,802 B1 | 4/2001 | Risch et al. |
| 6,215,931 B1 | 4/2001 | Risch et al. |
| 6,314,224 B1 | 11/2001 | Stevens et al. |
| 6,321,012 B1 | 11/2001 | Shen |
| 6,321,014 B1 | 11/2001 | Overton et al. |
| 6,334,016 B1 | 12/2001 | Greer, IV |
| 6,381,390 B1 | 4/2002 | Hutton et al. |
| 6,493,491 B1 | 12/2002 | Shen et al. |
| 6,501,887 B1 * | 12/2002 | Bringuier et al. ............ 385/109 |
| 6,603,908 B2 | 8/2003 | Dallas et al. |
| 6,618,538 B2 | 9/2003 | Nechitailo et al. |
| 6,658,184 B2 | 12/2003 | Bourget et al. |
| 6,749,446 B2 | 6/2004 | Nechitailo |

(Continued)

FOREIGN PATENT DOCUMENTS

| | | |
|---|---|---|
| EP | 1921478 A1 | 5/2008 |
| WO | 2009/062131 A1 | 5/2009 |

OTHER PUBLICATIONS

U.S. Appl. No. 12/953,948, "High-Bandwidth, Multimode Optical Fiber with Reduced Cladding Effect," filed Nov. 24, 2010, pp. 1-75.

(Continued)

*Primary Examiner* — Rhonda Peace
(74) *Attorney, Agent, or Firm* — Additon, Higgins, Pendleton & Ashe, P.A.

(57) ABSTRACT

The present invention relates to flame-retardant fiber optic cables. The fiber optic cables include reinforcing materials that generate low smoke levels and exhibit improved performance during burn testing. The fiber optic cables are capable of meeting burn testing requirements without employing expensive, high-performance cable jacketing and buffering compounds.

23 Claims, 2 Drawing Sheets

(56) References Cited

U.S. PATENT DOCUMENTS

| | | | |
|---|---|---|---|
| 6,912,347 B2 | 6/2005 | Rossi et al. | |
| 6,922,515 B2 | 7/2005 | Nechitailo et al. | |
| 6,941,049 B2 | 9/2005 | Risch et al. | |
| 7,045,010 B2 | 5/2006 | Sturman, Jr. | |
| 7,162,128 B2 | 1/2007 | Lovie et al. | |
| 7,322,122 B2 | 1/2008 | Overton et al. | |
| 7,340,134 B1* | 3/2008 | Hudson et al. | 385/100 |
| 7,346,244 B2 | 3/2008 | Gowan et al. | |
| 7,356,234 B2 | 4/2008 | de Montmorillon et al. | |
| 7,483,613 B2 | 1/2009 | Bigot-Astruc et al. | |
| 7,515,795 B2 | 4/2009 | Overton et al. | |
| 7,526,177 B2 | 4/2009 | Matthijsse et al. | |
| 7,555,186 B2 | 6/2009 | Flammer et al. | |
| 7,567,739 B2 | 7/2009 | Overton et al. | |
| 7,570,852 B2 | 8/2009 | Nothofer et al. | |
| 7,587,111 B2 | 9/2009 | de Montmorillon et al. | |
| 7,599,589 B2 | 10/2009 | Overton et al. | |
| 7,623,747 B2 | 11/2009 | de Montmorillon et al. | |
| 7,639,915 B2 | 12/2009 | Parris et al. | |
| 7,646,952 B2 | 1/2010 | Parris | |
| 7,646,954 B2 | 1/2010 | Tatat | |
| 7,702,204 B2 | 4/2010 | Gonnet et al. | |
| 7,724,998 B2 | 5/2010 | Parris et al. | |
| 7,817,891 B2 | 10/2010 | Lavenne et al. | |
| 2004/0002559 A1* | 1/2004 | Troutman et al. | 524/100 |
| 2006/0079612 A1* | 4/2006 | Troutman et al. | 524/99 |
| 2008/0279514 A1* | 11/2008 | Kundis et al. | 385/113 |
| 2008/0292262 A1 | 11/2008 | Overton et al. | |
| 2009/0175583 A1 | 7/2009 | Overton | |
| 2009/0214167 A1 | 8/2009 | Lookadoo et al. | |
| 2009/0252469 A1 | 10/2009 | Sillard et al. | |
| 2009/0279833 A1 | 11/2009 | Overton et al. | |
| 2009/0279835 A1 | 11/2009 | de Montmorillon et al. | |
| 2009/0297107 A1 | 12/2009 | Tatat | |
| 2010/0021170 A1 | 1/2010 | Lumineau et al. | |
| 2010/0028020 A1 | 2/2010 | Gholami et al. | |
| 2010/0067855 A1 | 3/2010 | Barker | |
| 2010/0067857 A1 | 3/2010 | Lovie et al. | |
| 2010/0086268 A1* | 4/2010 | Reyes | 385/100 |
| 2010/0092135 A1 | 4/2010 | Barker et al. | |
| 2010/0092138 A1 | 4/2010 | Overton | |
| 2010/0092139 A1 | 4/2010 | Overton | |
| 2010/0092140 A1 | 4/2010 | Overton | |
| 2010/0118388 A1 | 5/2010 | Pastouret et al. | |
| 2010/0119202 A1 | 5/2010 | Overton | |
| 2010/0135623 A1 | 6/2010 | Overton | |
| 2010/0135624 A1 | 6/2010 | Overton et al. | |
| 2010/0135625 A1 | 6/2010 | Overton | |
| 2010/0135627 A1 | 6/2010 | Pastouret et al. | |
| 2010/0142033 A1 | 6/2010 | Regnier et al. | |
| 2010/0142969 A1 | 6/2010 | Gholami et al. | |
| 2010/0150505 A1 | 6/2010 | Testu et al. | |
| 2010/0154479 A1 | 6/2010 | Milicevic et al. | |
| 2010/0166375 A1 | 7/2010 | Parris | |
| 2010/0171945 A1 | 7/2010 | Gholami et al. | |
| 2010/0183821 A1 | 7/2010 | Hartsuiker et al. | |
| 2010/0189397 A1 | 7/2010 | Richard et al. | |
| 2010/0189399 A1 | 7/2010 | Sillard et al. | |
| 2010/0189400 A1 | 7/2010 | Sillard et al. | |
| 2010/0202741 A1 | 8/2010 | Ryan et al. | |
| 2010/0214649 A1 | 8/2010 | Burov et al. | |
| 2010/0215328 A1 | 8/2010 | Tatat et al. | |
| 2010/0254653 A1 | 10/2010 | Molin et al. | |
| 2010/0310218 A1 | 12/2010 | Molin et al. | |
| 2011/0026889 A1 | 2/2011 | Risch et al. | |
| 2011/0044595 A1 | 2/2011 | Sillard et al. | |
| 2011/0058781 A1 | 3/2011 | Molin et al. | |
| 2011/0064367 A1 | 3/2011 | Molin et al. | |
| 2011/0064371 A1 | 3/2011 | Leatherman et al. | |
| 2011/0069724 A1 | 3/2011 | Richard et al. | |
| 2011/0069932 A1 | 3/2011 | Overton et al. | |
| 2011/0091171 A1 | 4/2011 | Tatat et al. | |
| 2011/0116160 A1 | 5/2011 | Boivin et al. | |
| 2011/0262148 A1* | 10/2011 | Weimann | 398/142 |
| 2011/0305420 A1* | 12/2011 | Bickham et al. | 385/78 |

OTHER PUBLICATIONS

U.S. Appl. No. 12/954,036, "High-Bandwidth, Dual-Trench-Assisted Multimode Optical Fiber," filed Nov. 24, 2010, pp. 1-72.

U.S. Appl. No. 12/959,688, "Multimode Optical Fiber with Low Bending Losses," filed Dec. 3, 2010, pp. 1-80.

U.S. Appl. No. 12/959,866, "High-Bandwidth, Multimode Optical Fiber Having Reduced Bending Losses," filed Dec. 3, 2010, pp. 1-68.

U.S. Appl. No. 13/017,089, "Non-Zero Dispersion Shifted Optical Fiber Having a Large Effective Area," filed Jan. 31, 2011, pp. 1-69.

U.S. Appl. No. 13/017,092, "Non-Zero Dispersion Shifted Optical Fiber Having a Short Cutoff Wavelength," filed Jan. 31, 2011, pp. 1-70.

U.S. Appl. No. 13/037,943, "Broad-Bandwidth Multimode Optical Fiber Having Reduced Bending Losses," filed Mar. 1, 2011, pp. 1-88.

U.S. Appl. No. 13/048,028, "Single-Mode Optical Fiber," filed Mar. 15, 2011, pp. 1-70.

U.S. Appl. No. 13/009,118, "Water-Soluble Water-Blocking Element," filed Jan. 19, 2011, pp. 1-50.

U.S. Appl. No. 13/096,178, "Data-Center Cable," filed Apr. 28, 2011, pp. 1-46.

U.S. Appl. No. 13/099,663, "Bundled Fiber Optic Cables," filed May 3, 2011, pp. 1-55.

* cited by examiner

LOW-SMOKE AND FLAME-RETARDANT FIBER OPTIC CABLES

CROSS-REFERENCE TO PRIORITY APPLICATION

This application hereby claims the benefit of U.S. Patent Application No. 61/349,365 for Low-Smoke and Flame-Retardant Fiber Optic Cables (filed May 28, 2010), which is hereby incorporated by reference in its entirety.

FIELD OF THE INVENTION

The invention relates to optical fiber telecommunications cables.

BACKGROUND

Optical fibers provide advantages over conventional communication lines. As such, fiber optic cables are becoming increasingly popular.

For certain applications, fiber optic cables need to pass burn tests that measure flame propagation and smoke generation. Exemplary burn tests are NFPA-262 and UL-910, each of which is hereby incorporated by reference in its entirety. In some fiber optic cable designs, several grades of flame-retardant compounds are used in order to achieve compliance with various cable burn test requirements. In particular, when attempting to make a cable design that will pass a burn test such as NFPA-262, choice of cable materials can substantially affect burn performance.

For example, high burn performance materials such as polyvinylidene fluoride (PVDF) may be used. PVDF materials, however, increase the cost of producing the cable. Polyvinyl chloride (PVC) materials may be used in place of PVDF materials, but cable designs using PVC materials do not perform as well as PVDF materials in burn tests.

To achieve compliant burn test results, jacketing or buffer tube compounds with higher levels of flame retardancy (e.g., PVDF) are typically used. Additionally, flame-retardant barrier tapes may be employed.

In general, it is more costly to use materials (e.g., PVDF) having better performance with respect to flame retardancy and smoke generation. The use of flame-retardant barrier tapes such as NOMEX® tape, adds cost, increases processing complexity, and also creates another structural layer that can complicate cable access.

In view of the foregoing, there exists a need for a fiber optic cable having improved overall cable flammability (i.e., improved flame retardancy and reduced smoke generation) without resorting to high-cost jacketing or buffering compounds or otherwise employing expensive and difficult-to-apply barrier tapes.

SUMMARY

Accordingly, in one aspect, the present invention embraces fiber optic cable designs that use strength members (i.e., reinforcing materials) that include polymeric matrix materials having a low level of smoke generation and improved burn performance. Typically, the strength members can be quantified as low smoke by a smoke density of less than 200 at a heat flux (or thermal flux) of $50 kW/m^2$ and/or $80 kW/m^2$ as tested in a cone calorimeter. Such strength members are used in the construction of fiber optic cables that comply with the NFPA-262 cable burn test.

In some exemplary embodiments, the present invention embraces fiber optic cable designs employing strength members that include thermally-cured polyester acrylates.

In other exemplary embodiments, the present invention embraces fiber optic cable designs employing strength members that include UV-cured acrylic compositions.

In yet another aspect, the present invention embraces fiber optic cable designs employing glass strength yarns that are coated with thermally-cured polyester acrylate and/or UV-cured acrylic compositions.

In yet another aspect, the present invention embraces fiber optic cable designs employing glass-reinforced-plastic reinforcing rods that are coated with thermally-cured polyester acrylate and/or UV-cured acrylic compositions.

The foregoing illustrative summary, as well as other exemplary objectives and/or advantages of the invention, and the manner in which the same are accomplished, are further explained within the following detailed description and its accompanying drawing.

DETAILED DESCRIPTION

Figure 1:
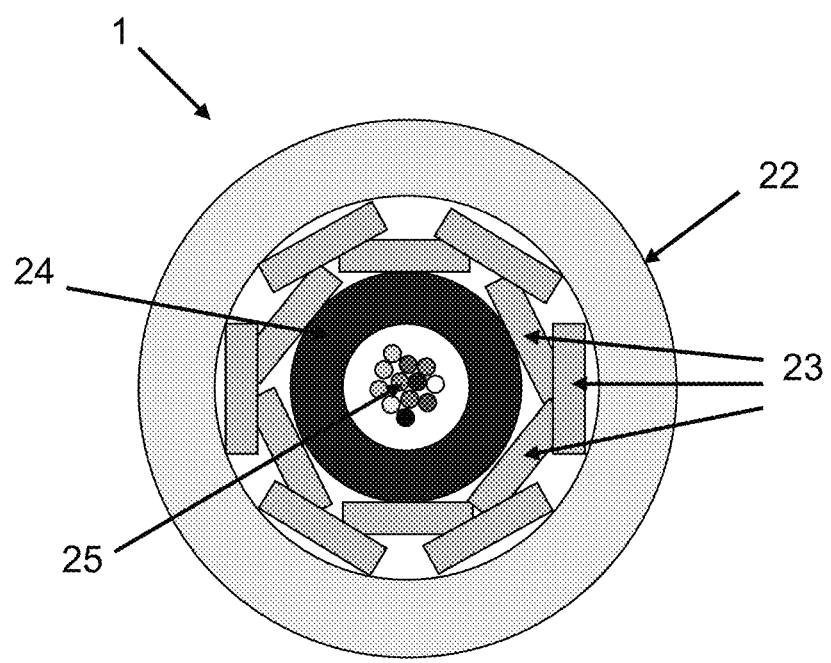
FIG. 1 schematically depicts a cross-sectional view of an exemplary fiber optic cable according to the present invention.

Cable-reinforcing materials (e.g., strength members) such as glass yarns or GRP rods (i.e., glass-reinforced-plastic rods) are used in many cable designs. Glass, which has excellent fire resistance, typically accounts for at least 70 weight percent of these reinforcing materials. GRP composite rods and glass reinforcing yarns also have a polymeric component that accounts for the remaining composition of the material.

Various polymeric matrix materials can be used to produce GRP rods or other strength members. Although these materials may be essentially interchangeable in terms of providing suitable reinforcing properties, the flammability component, especially smoke generation, can vary substantially depending on the polymeric matrix materials being used.

Without being bound to any particular theory, the present inventors have found that the strength members may be the largest source of smoke generation. In some cases, the choice of the polymeric matrix material used in the reinforcing material can make the difference between consistently passing or failing a burn test, especially one in which smoke-density measurements are taken. For example, the use of epoxies as a reinforcing material may result in particularly poor smoke-generation performance.

Furthermore, because (i) the strength members are a relatively small fraction of an optical fiber cable's cross-sectional area and (ii) the polymeric matrix material is only a relatively small fraction of the strength member, it is somewhat surprising that the polymeric matrix material present in strength members can have such an adverse effect on an optical fiber cable's burn test results.

Accordingly, the present fiber optic cable designs may employ strength members (i.e., reinforcing materials) that include polymeric matrix materials having a low level of smoke generation and improved burn performance. Such strength members are conventionally not engineered around burn and smoke performance. As previously noted, typically the reinforcing materials can be quantified as low smoke by a smoke density of less than 200 at a heat flux of 50 kW/m$^2$ and/or 80 kW/m$^2$ as tested in a cone calorimeter. (As will be known by those having ordinary skill in the art, smoke density is reported as a dimensionless value.) The reinforcing materials may be used in the construction of fiber optic cables that are compliant to a NFPA-262 cable burn test.

By employing such strength members, substantial cost reductions can be achieved by using lower cost cable jacketing and/or buffering compounds.

One method of distinguishing between reinforcing materials with various burn test performance levels involves limiting oxygen index (LOI) and smoke-density testing.

The LOI test is a widely used research and quality control tool for determining the relative flammability of polymeric materials. Typically, the LOI of a particular sample can be expressed as the percentage of oxygen in an oxygen-nitrogen mixture that is required to support downward burning of a vertically mounted test specimen. Hence, higher LOI values represent better flame retardancy. LOI tests can be conducted in accordance with national and international standards, including BS 2782 (Part 1, Method 141), ASTM D2863 and ISO 4589-2. Each of these standards is hereby incorporated by reference in its entirety.

Table 1 (below) contains LOI test data and qualitative smoke-density testing data from three GRP rods (i.e., glass-reinforced-plastic reinforcing rods) containing (i) thermally-cured polyester acrylate, (ii) an epoxy acrylate composition, and (iii) a UV-cured acrylic composition. The smoke density data was observed from the actual LOI test sample.

TABLE 1

|  | Thermally-Cured Polyester Acrylate | Epoxy Acrylate Composition | UV-Cured Acrylic Composition |
|---|---|---|---|
| LOI (% O$_2$) | 37-38 | 39-40 | 39-40 |
| Smoke (qualitative) | Light | Heavy | Medium |

As shown in Table 1, the thermally-cured polyester acrylate generated a lower smoke density upon burning than the other two samples, while the epoxy acrylate composition generated the highest smoke density.

Table 2 (below) provides LOI test data for coated glass reinforcing yarns. A sample of comparative epoxy-acrylate-coated glass strength yarns exhibited an LOI of 46. A sample of polyester-acrylate-coated glass strength yarns in accordance with an exemplary embodiment of the present invention exhibited an LOI of greater than 60.

TABLE 2

|  | Epoxy-Acrylate-Coated Glass Strength Yarns | Polyester-Acrylate-Coated Glass Strength Yarns |
|---|---|---|
| LOI (% O$_2$) | 46 | >60 |

Another method of distinguishing between reinforcing materials with various burn test performance levels involves cone calorimeter testing. During cone calorimeter testing, the surface of the test specimen is exposed to a constant level of heat irradiance from a conical heater (i.e., a value within the range 0-100 kilowatts/m$^2$). Volatile gases from the heated specimen are ignited by an electrical spark igniter. Combustion gases are collected by an exhaust hood for further analysis. This gas analysis makes it possible to calculate heat release rate (HRR) and to assess production of toxic gases from the specimen. Smoke production is assessed by measuring attenuation of a laser beam caused by exhaust-duct smoke. The attenuation is related to volume flow, resulting in a measure of smoke density. In general, the measurements including area units (i.e., m$^2$) are related to the surface area of the test specimen. One particular method of measuring the smoke-generating characteristics of material samples is the ASTM E 662 method, which is hereby incorporated by reference in its entirety.

Tables 3A and 3B (below) contain cone calorimeter test data from three GRP rods (i.e., glass-reinforced-plastic reinforcing rods) containing (i) a UV-cured acrylic composition, (ii) an epoxy acrylate composition, and (iii) thermally-cured polyester acrylate. Multiple samples of each kind of GRP rod were tested, and the data from each kind of sample was averaged to produce the values in the table. The data in Table 3A and Table 3B includes (i) the average heat release rate (i.e., mean HRR), (ii) the peak heat release rate, and (iii) smoke density.

Those having ordinary skill in the art will recognize that the smoke-generation results of cone calorimeter testing can be expressed in terms of specific optical density. The specific optical density is derived from a geometrical factor and the measured optical density, which is a measurement that reflects the concentration of smoke. In this regard, the smoke density is a dimensionless ratio (i.e., having no units).

Tables 3A and 3B (below) contain cone calorimeter test data at heat fluxes of 50 kilowatts/m$^2$ and 80 kilowatts/m$^2$, respectively.

TABLE 3A

| Heat Flux = 50 kW/m$^2$ | Mean HRR (kW/m$^2$) | Peak HRR (kW/m$^2$) | Smoke Density |
|---|---|---|---|
| UV-Cured Acrylic Composition | 40 | 240 | 244 |
| Epoxy Acrylate Composition | 52 | 307 | 301 |
| Thermally-Cured Polyester Acrylate | 43 | 262 | 178 |

TABLE 3B

| Heat Flux = 80 kW/m$^2$ | Mean HRR (kW/m$^2$) | Peak HRR (kW/m$^2$) | Smoke Density |
|---|---|---|---|
| UV-Cured Acrylic Composition | 59 | 324 | 233 |
| Epoxy Acrylate Composition | 77 | 440 | 302 |
| Thermally-Cured Polyester Acrylate | 65 | 409 | 199 |

To further illustrate the advantages of the optical fiber cables according to the present invention, two otherwise identical 288-fiber loose tube cables were manufactured using two kinds of reinforcing materials. The first cable, which represents one exemplary embodiment of the present invention, contained reinforcing material made of low-smoke, thermally-cured polyester epoxy acrylate with a LOI value greater than 37; the other comparative cable contained reinforcing material made of epoxy acrylate. As shown in Table 4 (below), the first cable performed significantly better than the second cable in cable UL-1666 riser burn tests. The UL-1666 riser burn test (i.e., its test method and requirements) is hereby incorporated by reference in its entirety.

TABLE 4

|  | Cable 1 | Cable 2 (Comparative) |
| --- | --- | --- |
| Time to Ignition (sec) | 22 | 20 |
| Afterflame (sec) | 643 | 1112 |
| Maximum Cable Damage | Melt: 56 in. | Melt: 72 in. |
|  | Char: 42 in. | Char: 61 in. |
|  | Ash: 12 in. | Ash: 24 in. |
| Pass/Fail | Pass | Fail |
| Peak Smoke (m$^2$/sec) | 0.004 | N/A |
| Total Smoke (m$^2$) | 2.056 | N/A |

As yet another illustration of the advantages of the optical fiber cables according to the present invention, two otherwise identical 12-fiber plenum central tube cables were manufactured using two kinds of glass reinforcing yarns, namely the same kinds of yarns described in Table 2 (above). The first cable, which represents an exemplary embodiment of the present invention, contained polyester-acrylate-coated glass yarns having a measured LOI value greater than 60; the other comparative cable contained epoxy-acrylate-coated glass yarns having a measured LOI value of about 46. As shown in Table 5 (below), the first cable achieved passing results for NFPA-262 plenum burn testing, whereas the second cable had failing results. The NFPA-262 plenum burn testing was performed twice on portions of the first cable.

TABLE 5

|  | NFPA 262 Requirement | Cable 1: Test 1 | Cable 1: Test 2 | Cable 2 (Comparative) |
| --- | --- | --- | --- | --- |
| Peak Flame Spread (ft.) | <5 | 1.5 | 1.6 | 2.2 |
| Peak Optical Density | <0.5 | 0.240 | 0.413 | 0.740 |
| Average Optical Density | <0.15 | 0.079 | 0.082 | 0.108 |

As shown in Table 5 (above), the cable according to one embodiment of the present invention (Cable 1) exhibits substantially improved performance with respect to flame retardancy and smoke generation. Indeed, Cable 1 complies with the NFPA 262 plenum burn ratings. By way of comparison, Cable 1 displayed peak flame spread that was 27 percent less than that of Cable 2, and Cable 1 displayed peak optical density that was 55 percent less than that of Cable 2.

FIG. 1 schematically depicts a cross-sectional view of an exemplary optical fiber cable according to the present invention. The fiber optic cable 1 includes twelve optical fibers 25 centrally positioned within a buffer tube 24 (i.e., within the free space defined by the buffer tube). Twelve low-smoke, flame-retardant coated glass yarns 23 are helically stranded around the buffer tube 24. As shown, the glass yarns 23 are stranded in two layers on the exterior of the buffer tube 24. Cable sheathing 22 (e.g., a cable jacket) is provided around the glass yarns 23.

Figure 2:
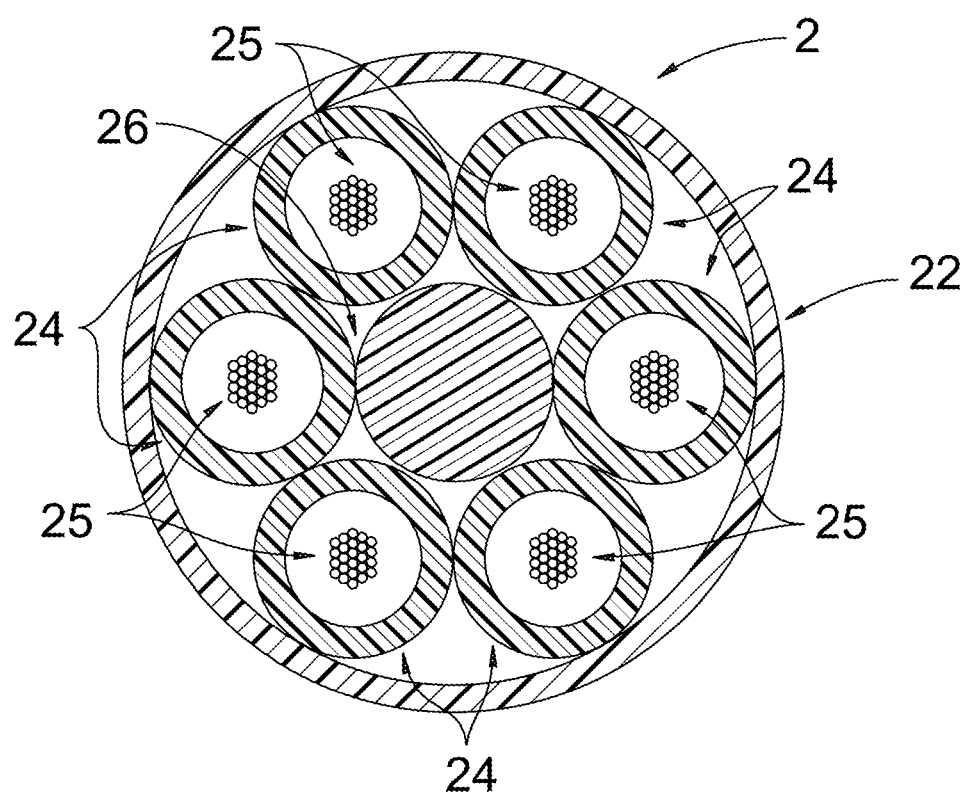
FIG. 2 schematically depicts a cross-sectional view of another exemplary fiber optic cable according to the present invention.

FIG. 2 schematically depicts a cross-sectional view of another exemplary optical fiber cable according to the present invention. The loose tube, fiber optic cable 2 depicted in FIG. 2 includes a plurality of buffer tubes 24 arranged around a central strength member 26 (e.g., a glass-reinforced-plastic reinforcing rod). Each of the buffer tubes includes a plurality of optical fibers 25. Cable sheathing 22 (e.g., a cable jacket) is provided around the central strength member 26 and the plurality of buffer tubes 24.

As previously discussed, the glass yarns 23 are strength members that reinforce the structure of the fiber optic cable 1. Furthermore, the glass yarns 23 typically include polyester acrylate (e.g., a polyester acrylate coating). Additionally, the glass yarns 23 typically exhibit a smoke density of less than 200 during cone calorimeter testing at a heat flux of 50 kW/m$^2$ and/or 80 kW/m$^2$.

The buffer tube 24 and the cable sheathing 22 may be constructed of materials other than polyvinylidene fluoride (PVDF), which can be prohibitively expensive. Such alternative materials might be specifically enhanced to improve smoke-generation performance or flame-retardant characteristics of the fiber optic cable 1—albeit typically to a lesser degree than polyvinylidene fluoride (PVDF), which has outstanding smoke-generation performance or flame-retardant properties. Other alternative materials might be more conventional cabling materials, even though the intended end product is low-smoke and flame-retardant cables. In accordance with the foregoing, an exemplary buffer tube 24 may be made of PVC (e.g., a flame-retardant PVC compound) or polyolefin (polypropylene and/or polyethylene polymers and copolymers). By way of example, buffer tube 24 and/or cable sheathing 22 may be formed from filled PVC having a density of less than 2.0 g/cm$^3$ (e.g., between about 1.3 g/cm$^3$ and 1.7 g/cm$^3$), typically between about 1.4 g/cm$^3$ and 1.6 g/cm$^3$ (e.g., about 1.5 g/cm$^3$). As noted, an exemplary buffer tube 24 is free of polyvinylidene fluoride (PVDF) (i.e., the buffer tube 24 does not contain more than trace amounts of PVDF) and therefore reduces manufacturing costs. Despite the use of these kinds of materials for the buffer tube 24 and/or the cable sheathing 22, the fiber optic cable 1 complies with the requirements of the NFPA-262 cable burn test.

Further exemplary embodiments of the present invention may include buffer tubes 24 constructed of a low-smoke zero-halogen (LSZH) flame retardant compound. Additionally, the cable sheathing 22 may be made of a flame-retardant PVC compound, a low-smoke zero-halogen (LSZH) flame retardant compound, and/or polyvinylidene fluoride (PVDF) (e.g., PVDF having a density of between about 1.75 g/cm$^3$ and 1.8 g/cm$^3$). In some exemplary embodiments, the cable sheathing 22 is free of polyvinylidene fluoride (PVDF) (i.e., the cable sheathing 22 does not contain PVDF) and therefore provides reduced manufacturing costs To supplement the present disclosure, this application incorporates entirely by reference the following commonly assigned patents, patent application publications, and patent applications: U.S. Pat. No. 4,838,643 for a Single Mode Bend Insensitive Fiber for Use in Fiber Optic Guidance Applications (Hodges et al.); U.S. Pat. No. 7,623,747 for a Single Mode Optical Fiber (de Montmorillon et al.); U.S. Pat. No. 7,587,111 for a Single-Mode Optical Fiber (de Montmorillon et al.); U.S. Pat. No. 7,356,234 for a Chromatic Dispersion Compensating Fiber (de Montmorillon et al.); U.S. Pat. No. 7,483,613 for a Chromatic Dispersion Compensating Fiber (Bigot-Astruc et al.); U.S. Pat. No. 7,526,177 for a Fluorine-Doped Optical Fiber (Matthijsse et al.); U.S. Pat. No. 7,555,186 for an Optical Fiber (Flammer et al.); U.S. Patent Application Publication No. US2009/0252469 A1 for a Dispersion-Shifted Optical Fiber (Sillard et al.); U.S. Patent Application Publication No. US2011/0044595 A1 for a Transmission Optical Fiber Having Large Effective Area (Sillard et al.); International Patent Application Publication No. WO 2009/062131 A1 for a Microbend-Resistant Optical Fiber, (Overton); U.S. Patent Application Publication No. US2009/0175583 A1 for a Microbend-Resistant Optical Fiber, (Overton); U.S. Patent Application Publication No. US2009/0279835 A1 for a Single-Mode Optical Fiber Having Reduced Bending Losses, filed May 6, 2009, (de Montmorillon et al.); U.S. Pat. No. 7,889,960 for a Bend-Insensitive Single-Mode Optical Fiber, (de Montmorillon et al.);

U.S. Patent Application Publication No. US2010/0021170 A1 for a Wavelength Multiplexed Optical System with Multimode Optical Fibers, filed Jun. 23, 2009, (Lumineau et al.); U.S. Patent Application Publication No. US2010/0028020 A1 for a Multimode Optical Fibers, filed Jul. 7, 2009, (Gholami et al.); U.S. Patent Application Publication No. US2010/0119202 A1 for a Reduced-Diameter Optical Fiber, filed Nov. 6, 2009, (Overton); U.S. Patent Application Publication No. US2010/0142969 A1 for a Multimode Optical System, filed Nov. 6, 2009, (Gholami et al.); U.S. Patent Application Publication No. US2010/0118388 A1 for an Amplifying Optical Fiber and Method of Manufacturing, filed Nov. 12, 2009, (Pastouret et al.); U.S. Patent Application Publication No. US2010/0135627 A1 for an Amplifying Optical Fiber and Production Method, filed Dec. 2, 2009, (Pastouret et al.); U.S. Patent Application Publication No. US2010/0142033 for an Ionizing Radiation-Resistant Optical Fiber Amplifier, filed Dec. 8, 2009, (Regnier et al.); U.S. Patent Application Publication No. US2010/0150505 A1 for a Buffered Optical Fiber, filed Dec. 11, 2009, (Testu et al.); U.S. Patent Application Publication No. US2010/0171945 for a Method of Classifying a Graded-Index Multimode Optical Fiber, filed Jan. 7, 2010, (Gholami et al.); U.S. Patent Application Publication No. US2010/0189397 A1 for a Single-Mode Optical Fiber, filed Jan. 22, 2010, (Richard et al.); U.S. Patent Application Publication No. US2010/0189399 A1 for a Single-Mode Optical Fiber Having an Enlarged Effective Area, filed Jan. 27, 2010, (Sillard et al.); U.S. Patent Application Publication No. US2010/0189400 A1 for a Single-Mode Optical Fiber, filed Jan. 27, 2010, (Sillard et al.); U.S. Patent Application Publication No. US2010/0214649 A1 for an Optical Fiber Amplifier Having Nanostructures, filed Feb. 19, 2010, (Burov et al.); U.S. Patent Application Publication No. US2010/0254653 A1 for a Multimode Fiber, filed Apr. 22, 2010, (Molin et al.); U.S. Patent Application Publication No. US2010/0310218 A1 for a Large Bandwidth Multimode Optical Fiber Having a Reduced Cladding Effect, filed Jun. 4, 2010, (Molin et al.); U.S. Patent Application Publication No. US2011/0058781 A1 for a Multimode Optical Fiber Having Improved Bending Losses, filed Sep. 9, 2010, (Molin et al.); U.S. Patent Application Publication No. US2011/0064367 A1 for a Multimode Optical Fiber, filed Sep. 17, 2010, (Molin et al.); U.S. Patent Application Publication No. US2011/0069724 A1 for an Optical Fiber for Sum-Frequency Generation, filed Sep. 22, 2010, (Richard et al.); U.S. patent application Ser. No. 12/944,422 for a Rare-Earth-Doped Optical Fiber Having Small Numerical Aperture, filed Nov. 11, 2010, (Boivin et al.); U.S. patent application Ser. No. 12/953,948 for a High-Bandwidth, Multimode Optical Fiber with Reduced Cladding Effect, filed Nov. 24, 2010, (Molin et al.); U.S. patent application Ser. No. 12/954,036 for a High-Bandwidth, Dual-Trench-Assisted Multimode Optical Fiber, filed Nov. 24, 2010, (Molin et al.); U.S. patent application Ser. No. 12/959,688 for a Multimode Optical Fiber with Low Bending Losses and Reduced Cladding Effect, filed Dec. 3, 2010, (Molin et al.); U.S. patent application Ser. No. 12/959,866 for a High-Bandwidth Multimode Optical Fiber Having Reduced Bending Losses, filed Dec. 3, 2010, (Molin et al.); U.S. patent application Ser. No. 13/017,089 for a Non-Zero Dispersion Shifted Optical Fiber Having a Large Effective Area, filed Jan. 31, 2011, (Sillard et al.); U.S. patent application Ser. No. 13/017,092 for a Non-Zero Dispersion Shifted Optical Fiber Having a Short Cutoff Wavelength, filed Jan. 31, 2011, (Sillard et al.); U.S. patent application Ser. No. 13/037,943 for a Broad-Bandwidth Multimode Optical Fiber Having Reduced Bending Losses, filed Mar. 1, 2011, (Bigot-Astruc et al.); and U.S. patent application Ser. No. 13/048,028 for a Single-Mode Optical Fiber, filed Mar. 15, 2011, (de Montmorillon et al.).

To supplement the present disclosure, this application further incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for an Optical Unit for Fiber Optic Cables; U.S. Pat. No. 6,066,397 for Polypropylene Filler Rods for Optical Fiber Communications Cables; U.S. Pat. No. 6,175,677 for an Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Pat. No. 6,134,363 for a Method for Accessing Optical Fibers in the Midspan Region of an Optical Fiber Cable; U.S. Pat. No. 6,381,390 for a Color-Coded Optical Fiber Ribbon and Die for Making the Same; U.S. Pat. No. 6,181,857 for a Method for Accessing Optical Fibers Contained in a Sheath; U.S. Pat. No. 6,314,224 for a Thick-Walled Cable Jacket with Non-Circular Cavity Cross Section; U.S. Pat. No. 6,334,016 for an Optical Fiber Ribbon Matrix Material Having Optimal Handling Characteristics; U.S. Pat. No. 6,321,012 for an Optical Fiber Having Water Swellable Material for Identifying Grouping of Fiber Groups; U.S. Pat. No. 6,321,014 for a Method for Manufacturing Optical Fiber Ribbon; U.S. Pat. No. 6,210,802 for Polypropylene Filler Rods for Optical Fiber Communications Cables; U.S. Pat. No. 6,493,491 for an Optical Drop Cable for Aerial Installation; U.S. Pat. No. 7,346,244 for a Coated Central Strength Member for Fiber Optic Cables with Reduced Shrinkage; U.S. Pat. No. 6,658,184 for a Protective Skin for Optical Fibers; U.S. Pat. No. 6,603,908 for a Buffer Tube that Results in Easy Access to and Low Attenuation of Fibers Disposed Within Buffer Tube; U.S. Pat. No. 7,045,010 for an Applicator for High-Speed Gel Buffering of Flextube Optical Fiber Bundles; U.S. Pat. No. 6,749,446 for an Optical Fiber Cable with Cushion Members Protecting Optical Fiber Ribbon Stack; U.S. Pat. No. 6,922,515 for a Method and Apparatus to Reduce Variation of Excess Fiber Length in Buffer Tubes of Fiber Optic Cables; U.S. Pat. No. 6,618,538 for a Method and Apparatus to Reduce Variation of Excess Fiber Length in Buffer Tubes of Fiber Optic Cables; U.S. Pat. No. 7,322,122 for a Method and Apparatus for Curing a Fiber Having at Least Two Fiber Coating Curing Stages; U.S. Pat. No. 6,912,347 for an Optimized Fiber Optic Cable Suitable for Microduct Blown Installation; U.S. Pat. No. 6,941,049 for a Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Pat. No. 7,515,795 for a Water-Swellable Tape, Adhesive-Backed for Coupling When Used Inside a Buffer Tube (Overton et al.); U.S. Patent Application Publication No. 2008/0292262 for a Grease-Free Buffer Optical Fiber Buffer Tube Construction Utilizing a Water- Swellable, Texturized Yarn (Overton et al.); European Patent Application Publication No. 1,921,478 A1, for a Telecommunication Optical Fiber Cable (Tatat et al.); U.S. Pat. No. 7,702,204 for a Method for Manufacturing an Optical Fiber Preform (Gonnet et al.); U.S. Pat. No. 7,570,852 for an Optical Fiber Cable Suited for Blown Installation or Pushing Installation in Microducts of Small Diameter (Nothofer et al.); U.S. Pat. No. 7,646,954 for an Optical Fiber Telecommunications Cable (Tatat); U.S. Pat. No. 7,599,589 for a Gel-Free Buffer Tube with Adhesively Coupled Optical Element (Overton et al.); U.S. Pat. No. 7,567,739 for a Fiber Optic Cable Having a Water-Swellable Element (Overton); U.S. Pat. No. 7,817,891 for a Method for Accessing Optical Fibers within a Telecommunication Cable (Lavenne et al.); U.S. Pat. No. 7,639,915 for an Optical Fiber Cable Having a Deformable Coupling Element (Parris et al.); U.S. Pat. No. 7,646,952 for an Optical Fiber Cable Having Raised Coupling Supports (Parris); U.S. Pat. No. 7,724,998 for a Coupling Composition for Optical Fiber Cables (Parris et al.); U.S. Patent Application Publication No. US2009/0214167 A1 for a Buffer Tube with Hollow Channels, (Lookadoo et al.); U.S. Patent Application Publication No. US2009/0297107 A1 for an Optical Fiber Telecommunication Cable, filed May 15, 2009, (Tatat); U.S. Patent Application Publication No. US2009/0279833 A1 for a Buffer Tube with Adhesively Coupled Optical Fibers and/or Water-Swellable Element, filed Jul. 21, 2009, (Overton et al.); U.S. Patent Application Publication No. US2010/0092135 A1 for an Optical Fiber Cable Assembly, filed Sep. 10, 2009, (Barker et al.); U.S. Patent Application Publication No. US2010/0067857 A1 for a High-Fiber-Density Optical Fiber Cable, filed Sep. 10, 2009, (Lovie et al.); U.S. Patent Application Publication No. US2010/0067855 A1 for a Buffer Tubes for Mid-Span Storage, filed Sep. 11, 2009, (Barker); U.S. Patent Application Publication No. US2010/0135623 A1 for Single-Fiber Drop Cables for MDU Deployments, filed Nov. 9, 2009, (Overton); U.S. Patent Application Publication No. US2010/0092140 A1 for an Optical-Fiber Loose Tube Cables, filed Nov. 9, 2009, (Overton); U.S. Patent Application Publication No. US2010/0135624 A1 for a Reduced-Size Flat Drop Cable, filed Nov. 9, 2009, (Overton et al.); U.S. Patent Application Publication No. US2010/0092138 A1 for ADSS Cables with High-Performance Optical Fiber, filed Nov. 9, 2009, (Overton); U.S. Patent Application Publication No. US2010/0135625 A1 for Reduced-Diameter Ribbon Cables with High-Performance Optical Fiber, filed Nov. 10, 2009, (Overton); U.S. Patent Application Publication No. US2010/0092139 A1 for a Reduced-Diameter, Easy-Access Loose Tube Cable, filed Nov. 10, 2009, (Overton); U.S. Patent Application Publication No. US2010/0154479 A1 for a Method and Device for Manufacturing an Optical Preform, filed Dec. 19, 2009, (Milicevic et al.); U.S. Patent Application Publication No. US 2010/0166375 for a Perforated Water-Blocking Element, filed Dec. 29, 2009, (Parris); U.S. Patent Application Publication No. US2010/0183821 A1 for a UVLED Apparatus for Curing Glass-Fiber Coatings, filed Dec. 30, 2009, (Hartsuiker et al.); U.S. Patent Application Publication No. US2010/0202741 A1 for a Central-Tube Cable with High-Conductivity Conductors Encapsulated with High-Dielectric-Strength Insulation, filed Feb. 4, 2010, (Ryan et al.); U.S. Patent Application Publication No. US2010/0215328 A1 for a Cable Having Lubricated, Extractable Elements, filed Feb. 23, 2010, (Tatat et al.); U.S. Patent Application Publication No. US2011/0026889 A1 for a Tight-Buffered Optical Fiber Unit Having Improved Accessibility, filed Jul. 26, 2010, (Risch et al.); U.S. Patent Application Publication No. US2011/0064371 A1 for Methods and Devices for Cable Insertion into Latched Conduit, filed Sep. 14, 2010, (Leatherman et al.); U.S. Patent Publication No. 2011/0069932 A1 for a High-Fiber-Density Optical-Fiber Cable, filed Oct. 19, 2010, (Overton et al.); U.S. Patent Publication No. 2011/0091171 A1 for an Optical-Fiber Cable Having High Fiber Count and High Fiber Density, filed Oct. 19, 2010, (Tatat et al.); U.S. patent application Ser. No. 13/009,118 for a Water-Soluble Water-Blocking Element, filed Jan. 19, 2011, (Parris); U.S. patent application Ser. No. 13/096,178 for a Data-Center Cable, filed Apr. 28, 2011, (Lovie et al.); and U.S. patent application Ser. No. 13/099,663 for a Bundled Fiber Optic Cables, filed May 3, 2011, (Quinn et al.).

In the specification and/or figure, typical embodiments of the invention have been disclosed. The present invention is not limited to such exemplary embodiments. The use of the term "and/or" includes any and all combinations of one or more of the associated listed items. The figure is a schematic representation and so is not necessarily drawn to scale. Unless otherwise noted, specific terms have been used in a generic and descriptive sense and not for purposes of limitation.

The invention claimed is:

1. A fiber optic cable, comprising:
   at least one optical fiber positioned within a buffer tube;
   a strength member comprising a polyester-acrylate polymeric matrix material; and
   a cable jacket surrounding said buffer tube and said strength member;
   wherein said buffer tube and/or said cable jacket is free of polyvinylidene difluoride (PVDF);
   wherein said strength member exhibits a smoke density of less than 200 during cone calorimeter testing at a heat flux of 50 kW/m$^2$; and
   wherein the fiber optic cable complies with the requirements of the NFPA-262 cable burn test.

2. The fiber optic cable according to claim 1, comprising a plurality of buffer tubes each containing a plurality of optical fibers, said cable jacket surrounding said buffer tubes.

3. The fiber optic cable according to claim 1, wherein both said buffer tube and said cable jacket are free of polyvinylidene difluoride (PVDF).

4. The fiber optic cable according to claim 1, wherein said buffer tube and/or said cable jacket comprises PVC having a density between about 1.3 g/cm$^3$ and 1.7 g/cm$^3$.

5. The fiber optic cable according to claim 1, wherein said polyester-acrylate polymeric matrix material is thermally cured.

6. The fiber optic cable according to claim 1, wherein said polyester-acrylate polymeric matrix material is UV cured.

7. The fiber optic cable according to claim 1, wherein said strength member is a polyester-acrylate-coated glass yarn.

8. The fiber optic cable according to claim 1, wherein said strength member is a glass-reinforced plastic rod comprising polyester acrylate.

9. The fiber optic cable according to claim 1, wherein said strength member possesses a limiting oxygen index value of more than about 37.

10. The fiber optic cable according to claim 1, wherein the fiber optic cable is compliant with the UL-1666 riser burn test.

11. The fiber optic cable according to claim 1, wherein said strength member consists essentially of (i) polyester acrylate and (ii) at least 70 weight percent glass.

12. A fiber optic cable, comprising:
    at least one optical fiber positioned within a buffer tube;
    a strength member comprising a polyester-acrylate polymeric matrix material; and a cable jacket surrounding said buffer tube and said strength member;

wherein said buffer tube is free of polyvinylidene difluoride (PVDF);

wherein said strength member exhibits a smoke density of less than 200 during cone calorimeter testing at a heat flux of 80 kW/m$^2$; and wherein the fiber optic cable complies with the requirements of the NFPA-262 cable burn test.

13. The fiber optic cable according to claim 12, comprising a plurality of PVDF-free buffer tubes each containing a plurality of optical fibers, said cable jacket surrounding said buffer tubes.

14. The fiber optic cable according to claim 12, wherein said cable jacket is free of polyvinylidene difluoride (PVDF).

15. The fiber optic cable according to claim 12, wherein said buffer tube and/or said cable jacket is formed of PVC.

16. The fiber optic cable according to claim 12, wherein said polyester-acrylate polymeric matrix material is thermally cured or UV cured.

17. The fiber optic cable according to claim 12, wherein said strength member is a polyester-acrylate-coated glass yarn or a glass-reinforced plastic rod comprising polyester acrylate.

18. The fiber optic cable according to claim 12, wherein said strength member possesses a limiting oxygen index value of more than about 60.

19. The fiber optic cable according to claim 12, wherein the fiber optic cable is compliant with the UL-1666 riser burn test.

20. The fiber optic cable according to claim 12, wherein said strength member consists essentially of (i) polyester acrylate and (ii) at least 70 weight percent glass.

21. A fiber optic cable, comprising:
   at least one optical fiber positioned within a PVC buffer tube;
   a strength member comprising a polyester-acrylate polymeric matrix material; and
   a PVC cable jacket surrounding said buffer tube and said strength member;
   wherein said strength member exhibits a smoke density of less than 200 during cone calorimeter testing at a heat flux of 50 kW/m$^2$; and
   wherein the fiber optic cable complies with the requirements of the NFPA-262 cable burn test.

22. The fiber optic cable according to claim 21, wherein said strength member exhibits a smoke density of less than 200 during cone calorimeter testing at a heat flux of 80 kW/m$^2$.

23. The fiber optic cable according to claim 21, comprising a plurality of PVC buffer tubes each containing a plurality of optical fibers, said PVC cable jacket surrounding said PVC buffer tubes.

* * * * *